United States Patent [19]

Orrico

[11] Patent Number: 4,523,610
[45] Date of Patent: Jun. 18, 1985

[54] CHECK VALVE

[75] Inventor: Mario M. V. Orrico, Chicago, Ill.

[73] Assignee: Honeywell Inc., Minneapolis, Minn.

[21] Appl. No.: 643,098

[22] Filed: Aug. 22, 1984

Related U.S. Application Data

[63] Continuation of Ser. No. 380,967, May 24, 1982, abandoned.

[51] Int. Cl.$^3$ .............................................. F16K 15/14
[52] U.S. Cl. ................................ 137/512.15; 137/517;
137/859; 251/368
[58] Field of Search ...................... 137/512.15, 516.11,
137/517, 859; 251/61.1, 368; 524/611

[56] References Cited

U.S. PATENT DOCUMENTS

| | | |
|---|---|---|
| 236,719 | 1/1881 | Renton . |
| 256,875 | 4/1882 | Brainard . |
| 335,271 | 2/1886 | Chase . |
| 2,897,835 | 8/1959 | Philippe . |
| 2,908,283 | 10/1959 | Kiffer et al. . |
| 3,145,733 | 8/1964 | Shaw et al. ...................... 251/368 X |
| 3,741,232 | 6/1973 | Soberski . |
| 3,844,529 | 10/1974 | Brandt, Jr. et al. ................. 251/61.1 |
| 4,141,379 | 2/1979 | Manske ........................... 137/517 X |
| 4,388,422 | 6/1983 | Gerteisen et al. ............... 524/611 X |

FOREIGN PATENT DOCUMENTS 938931 10/1963 United Kingdom ................ 524/611

OTHER PUBLICATIONS

"Polycarbonates", Encyclopedia of Polymer Science and Technology, vol. 10, pp. 752–753, copyright 1969, John Wiley & Sons.

Primary Examiner—Martin P. Schwadron
Assistant Examiner—Stephen M. Hepperle
Attorney, Agent, or Firm—Trevor B. Joike

[57] ABSTRACT

A check valve is disclosed having a housing with first and second sides, the first side having an opening and the second side having an inner portion and an outer portion with openings within the inner portion, and a thin membrane within the housing and having an inner portion and an outer portion with holes within the outer portion such that, for air flows from the first side of the housing to the second side, the inner portion of the membrane will be pushed up against the inner portion of the second side of the housing to seal the openings in the inner portion of the second side and, for air flows from the second side of the housing to the first side, the membrane is pushed away from the inner portion of the second side for allowing air flow through the openings of the inner portion of the second side, through the holes in the membrane and then through the opening of the first side of the housing.

10 Claims, 3 Drawing Figures

CHECK VALVE

This application is a continuation of application Ser. No. 380,967 filed May 24, 1982, now abandoned.

BACKGROUND OF THE INVENTION

The present invention relates to a check valve which is capable of checking low reverse flows and, more particularly, to a check valve comprised of a membrane which is thin enough to react to low flows and which is made of a material which is not materially affected by static charge.

Check valves have long been known in the prior art. These check valves, which are analogous to a diode in an electronic setting, are used to allow fluid flow in only one direction. Thus, any reversal of the fluid flow in the undesired direction results in stoppage or checking of the flow.

Typical prior art check valves which use a disc which opens for flow in a first direction but which closes up against the housing for flow in the reverse direction have not been able to respond to low flows and pressure differentials in either direction. In the forward direction, they require a large flow and/or pressure differential in order to produce a useful output. When air flow reverses, prior art check valves will not close off until a larger than necessary pressure differential is attained. Until closed off, therefore, reverse flow will be permitted. Thus, many of these prior art check valves require nearly an inch of water pressure or more across the disc in the reverse direction for checking flow. The present invention, however, requires as little as 0.001 inches of water differential pressure across the membrane in order to check flow in the reverse direction.

SUMMARY OF THE INVENTION

Thus, the present invention comprises a housing having first and second sides, the first side having an opening and the second side having an inner portion and an outer portion with opening means within said inner portion, and a thin membrane held within the housing and having an inner portion corresponding to the inner portion of the second side of the housing and an outer portion corresponding with the outer portion of the second side of the housing and having holes within the outer portion of the membrane such that, for air flows from the first side of the housing to the second side, the inner portion of the membrane will cover the opening means of the second side of the housing to check flow through the housing and, for air flows from the second side of the housing to the first side, the inner portion of the membrane will be pushed away from the opening means of the housing for allowing fluid to flow through the opening means of the housing, through the holes of the membrane, and then through the opening of the first side.

BRIEF DESCRIPTION OF THE DRAWINGS

These and other features and advantages will become more apparent from a detailed consideration of the invention when taken in conjunction with the drawings in which.

DETAILED DESCRIPTION

Figure 3:
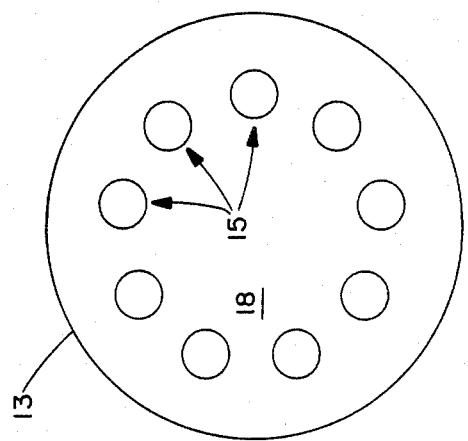
Figure 2:
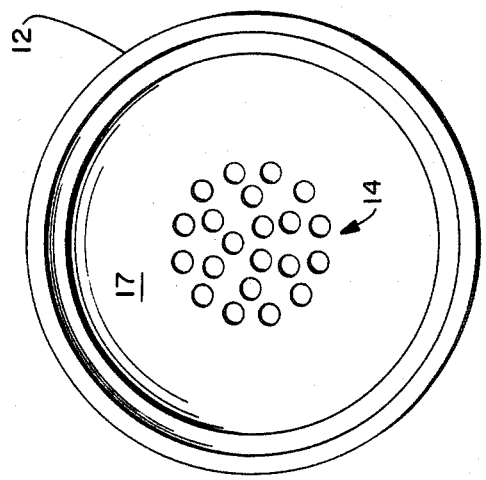
FIG. 2 shows a frontal view of the cover 12 which forms the second side of the housing shown in FIG. 1; and, FIG. 3 shows a frontal view of the membrane 13 located within the housing shown in FIG. 1.
Figure 1:
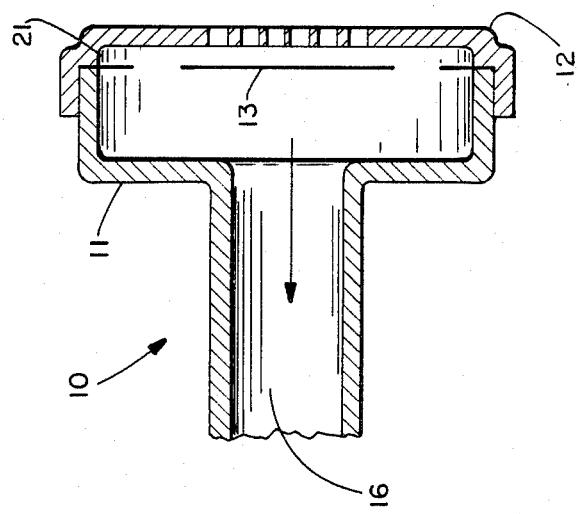
FIG. 1 is a cross sectional view of the check valve according to the present invention.

In FIG. 1, check valve 10 is comprised of a housing having a first side or cup 11 with an opening 16 therein for permitting fluid communication between the interior of check valve 10 and the exterior. Fitted over first side or cup 11 and held thereto by means not shown is a cover or second side 12 which is shown in more detail in FIG. 2.

Second side 12 has an outer portion 17 which is solid and an inner portion 14 which has a plurality of openings therein. These openings permit communication between the interior of check valve 10 and the exterior of the valve.

When second side or cover 12 is suitably attached to first side or cup 11 of check valve 10, membrane 13 is caught therebetween. Membrane 13 has an inner portion 18 which is solid and corresponds to the inner portion 14 of second side 12 of the housing of check valve 10 and has an outer portion within which holes 15 are located such that holes 15 are arranged around the periphery of membrane 13.

When air flows in a direction of the arrow as shown in FIG. 1, the pressure drop across membrane 13 pushes the membrane away from second side 12 so that air can flow through the openings in the inner portion 14 of second side 12, through holes 15 located in the outer portion of membrane 13 and then through opening 16 of the first side of check valve 10. However, upon reversal of the air flow, the differential pressure across membrane 13 will push membrane 13 against second side 12. Because the inner portion 18 of membrane 13 is larger than the inner portion 14 of second side 12 such that all of the openings within inner portion 14 are covered by inner portion 18 of membrane 13, the openings in inner portion 14 of second side 12 will be completely sealed and air flow through check valve 10 will be terminated.

In the preferred embodiment, membrane 13 is approximately 0.0003 inches thick and holes 15 have a diameter of 0.5 inches. Also, step 21 between second side 12 and membrane 13 should be on the order of 0.03 to 0.05 inches. With this construction, membrane 13 will respond to a differential pressure thereacross as low as 0.001 inches of water in order to seal inner portion 18 over the openings of inner portion 14 of second side 12 for reverse flows.

During assembly, when the two sides are mounted together with the membrane between, a vacuum is applied to allow the membrane to cover all the holes on the second side. Then the two sides are clamped together. The membrane will thus have slack and will not have to stretch in order to check reverse flow. The device is, therefore, more responsive to lower pressures than has heretofore been known.

Moreover, any static electricity on membrane 13 will cause membrane 13 to be attracted to second side 12 thereby cutting off low flows in the direction of the arrow shown in FIG. 1 or requiring too much pressure in the forward direction, as shown by the arrow in FIG. 1, to break membrane 13 away from second side 12 when air begins flowing in the proper direction. Therefore, in the preferred embodiment, membrane 13 is a carbon filled polycarbonate film which will dissipate any static electricity which otherwise might be attracted to it. Membrane 13 can be approximately 3.5 inches in diameter and is mounted with some slack so that it can easily seal off the openings within inner portion 14 of second side 12. The openings within inner portion 14 of second side 12 can be ¼ inch in diameter.

Moreover, by providing the openings within the inner portion of second side 12, the force of adhesion due to surface tension between membrane 13 and second side 12 is minimized or eliminated. This feature also improves the sensitivity and response to pressure change.

The embodiments of the invention in which an exclusive property or right is claimed are defined as follows:

1. A check valve comprising:
    a housing having first and second sides, said first side having an opening and said second side having a substantially flat surface containing an inner portion and an outer portion with opening means within said inner portion; and,
    a thin membrane, comprised of a carbon filled polycarbonate film, within said housing and having an inner portion and an outer portion with holes within said outer portion of said thin membrane and cooperating with said opening means of said second side of said housing such that, for air flows from said first side of said housing to said second side, said membrane will be pushed against said second side wherein said inner portion of said membrane will seal said opening means of said second side to check flow from said first side of said housing to said second side and, for air flows from said second side of said housing to said first side, said membrane will be pushed away from said second side to allow air flow through said opening means of said second side and said holes of said membrane and then through said opening of said first side, said housing supporting said thin membrane such that said thin membrane has slack so that when said membrane is pushed against said second side of said housing, said membrane will move without appreciable stretching, said membrane and said housing being dimensioned to respond to pressure differentials of much less than 1 inch of water.

2. The check valve of claim 1 wherein said membrane is approximately 0.0003 inches thick.

3. The check valve of claim 1 wherein said opening means comprises holes.

4. The check valve of claim 3 wherein said membrane is approximately 0.0003 inches thick.

5. The check valve of claim 1 wherein said housing comprises means for mounting the thin membrane a predetermined distance from said second side.

6. A check valve comprising:
    a housing having first and second sides, said first side having an opening and said second side having a substantially flat surface containing an inner portion and an outer portion with opening means within said inner portion; and,
    a thin membrane, comprised of a carbon filled polycarbonate film, within said housing and having an inner portion and an outer portion with holes within said outer portion of said thin membrane and cooperating with said opening means of said second side of said housing such that, for air flows from said first side of said housing to said second side, said membrane will be pushed against said second side wherein said inner portion of said membrane will seal said opening means of said second side to check flow from said first side of said housing to said second side and, for air flows from said second side of said housing to said first side, said membrane will be pushed away from said second side to allow air flow through said opening means of said second side and said holes of said membrane and then through said opening of said first side, said housing supporting said thin membrane such that said thin membrane has slack so that when said membrane is pushed against said second side of said housing, said membrane will move without appreciable stretching, said membrane and said housing being dimensioned so that said membrane will respond to approximately 0.001 inches of water pressure thereacross in the reverse flow direction to check said reverse flow.

7. The check valve of claim 6 wherein said membrane is approximately 0.0003 inches thick.

8. The check valve of claim 6 wherein said opening means comprises holes.

9. The check valve of claim 8 wherein said membrane is approximately 0.0003 inches thick.

10. The check valve of claim 6 wherein said housing comprises means for mounting the thin membrane a predetermined distance from said second side.

* * * * *